United States Patent
Fernández et al.

(10) Patent No.: US 7,406,752 B2
(45) Date of Patent: Aug. 5, 2008

(54) STRETCHING MEANS FOR FILIFORM ELEMENTS

(75) Inventors: Eduardo Roberto Fernández, Lanús Este-Pcia. de Buenos Aires (AR); Cesar Hugo Olivera, II. Biedma, 974 5° "A"-Cdad. de Buenos Aires (AR)

(73) Assignees: Eduardon Roberto Fernandez, Buenos Aires (AR); Cesar Hugo Olivera, Buenos Aires (AR)

( * ) Notice: Subject to any disclaimer, the term of this patent is extended or adjusted under 35 U.S.C. 154(b) by 201 days.

(21) Appl. No.: 11/088,578

(22) Filed: Mar. 23, 2005

(65) Prior Publication Data

US 2005/0224771 A1    Oct. 13, 2005

(30) Foreign Application Priority Data

Apr. 7, 2004 (AR) .............................. P040101190
Feb. 18, 2005 (AR) .............................. P050100600

(51) Int. Cl.
*F16G 11/00* (2006.01)
*B25B 25/00* (2006.01)

(52) U.S. Cl. ....................... 24/136 R; 242/222; 242/262

(58) Field of Classification Search ............... 24/115 M, 24/11 R, 136 K, 136 R; 242/388.2; 256/40, 256/199, 222, 262, 263, 388
See application file for complete search history.

(56) References Cited

U.S. PATENT DOCUMENTS

|  |  |  |  |  |  |
|---|---|---|---|---|---|
| 349,985 | A | * | 9/1886 | DeWitt | 254/222 |
| 2,519,921 | A | * | 8/1950 | Mock | 254/222 |
| 3,290,010 | A | * | 12/1966 | Holmes | 24/269 |
| 2002/0063247 | A1 | * | 5/2002 | Terzaghi | 254/222 |

* cited by examiner

*Primary Examiner*—Robert J Sandy
*Assistant Examiner*—Ruth C Rodriguez
(74) *Attorney, Agent, or Firm*—Amin Hallihan LLC

(57) ABSTRACT

A stretching device for filiform elements comprises a main body member (1) having ends, with one of the ends having a connection opening (2) and the opposite end of the plate member having a rotating mounting opening (3) in the rotating mounting opening there is a rotating part (6) having a command head (11) which forms a winding reel (7) for the wire to be stretched; mounted on the main body (1) is a slide mobile cramp (12). The winding to stretch the element is done by turning the command head (11). Once the suitable stretching has been achieved, the slide mobile cramp (12) is slid until said command head (11) is introduced into the cramp recess (15) formed by the cramp fork (14). Under these conditions, the rotating part (6) is fixed, keeping the tension on the filiform element.

16 Claims, 11 Drawing Sheets

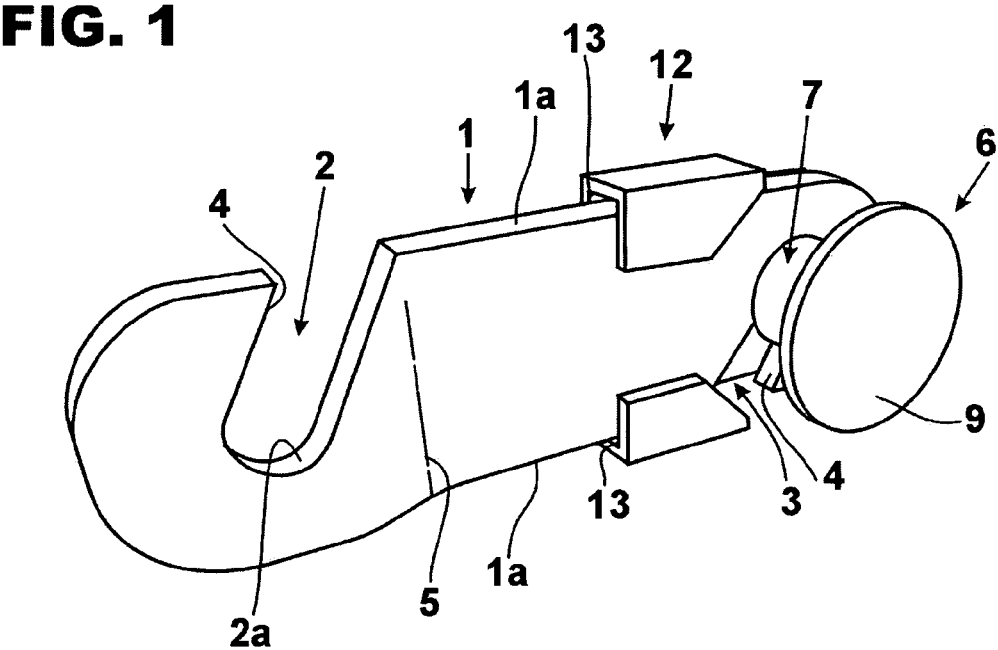
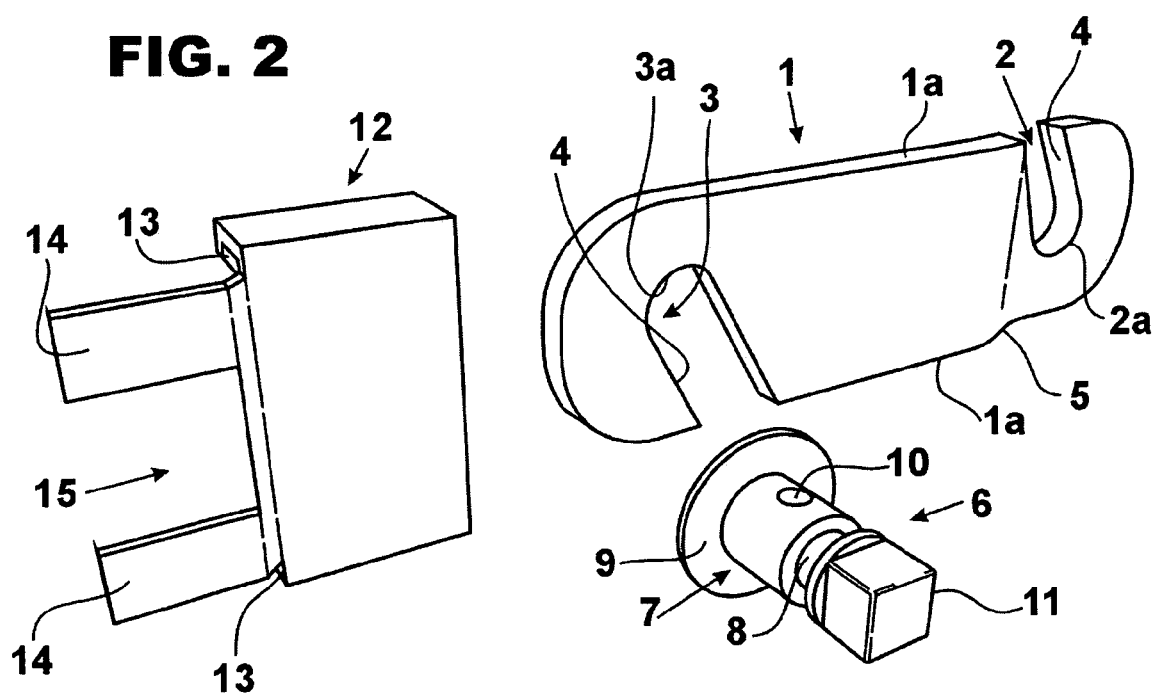

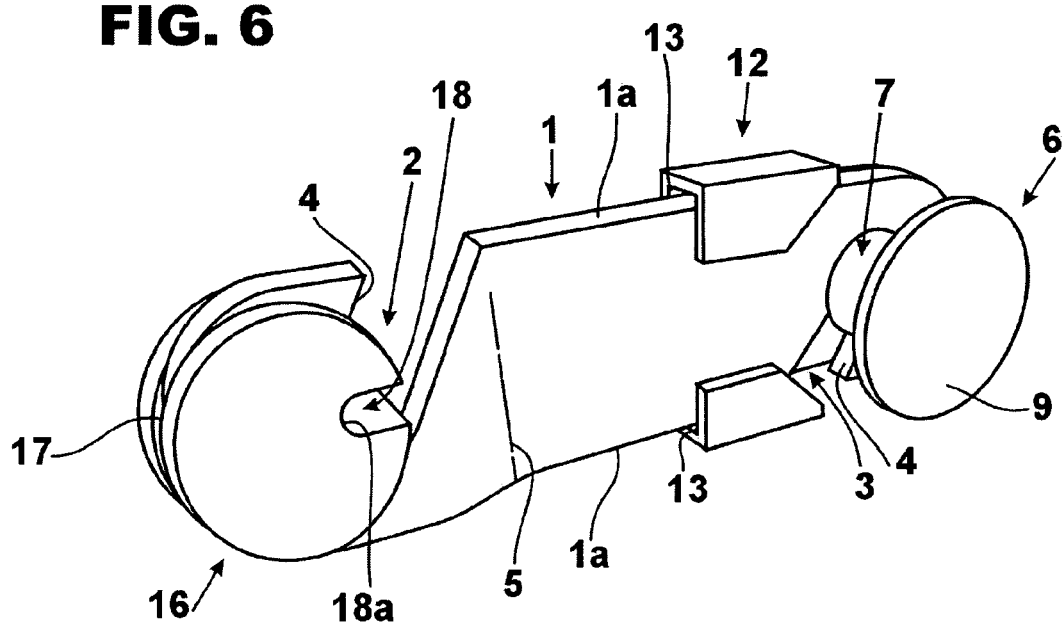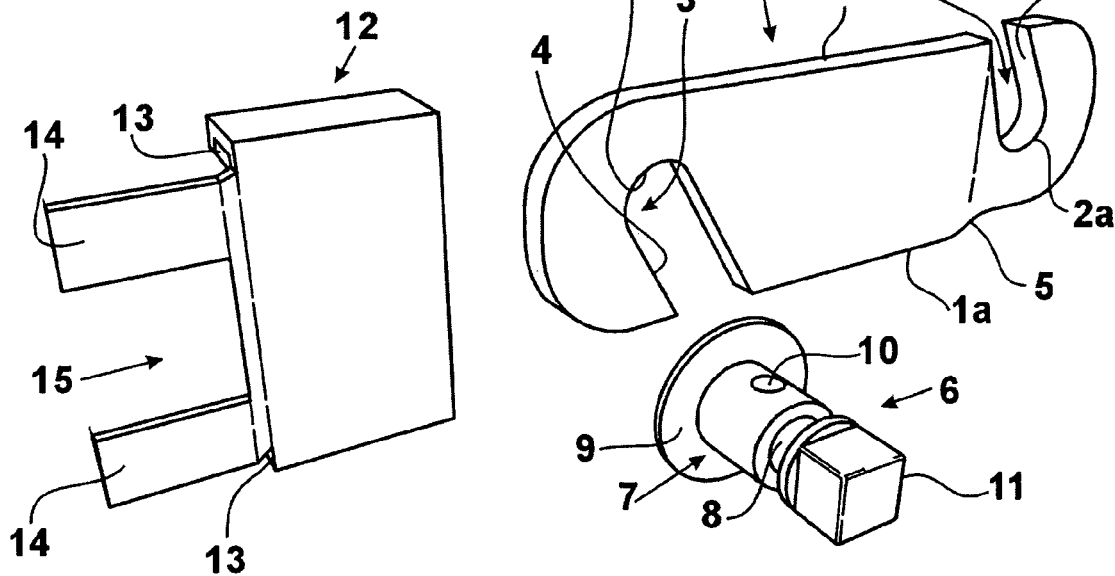

FIG. 16
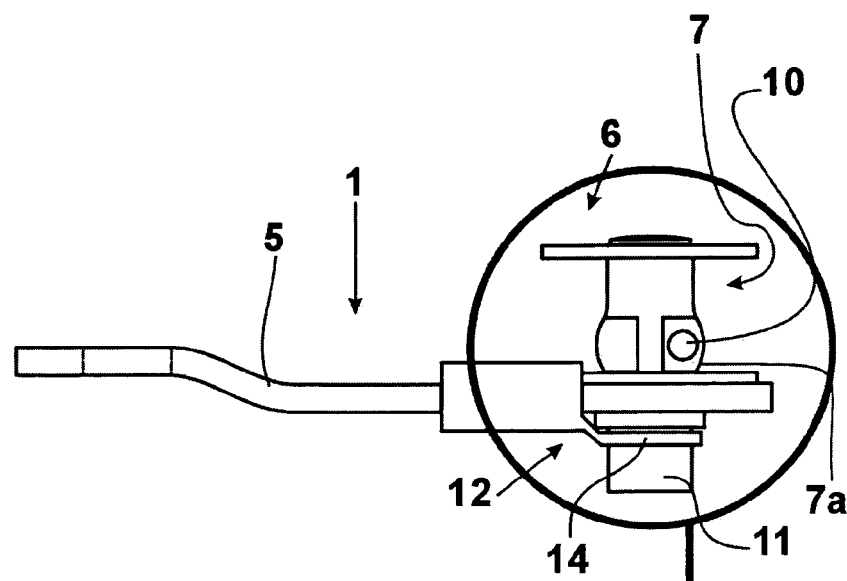
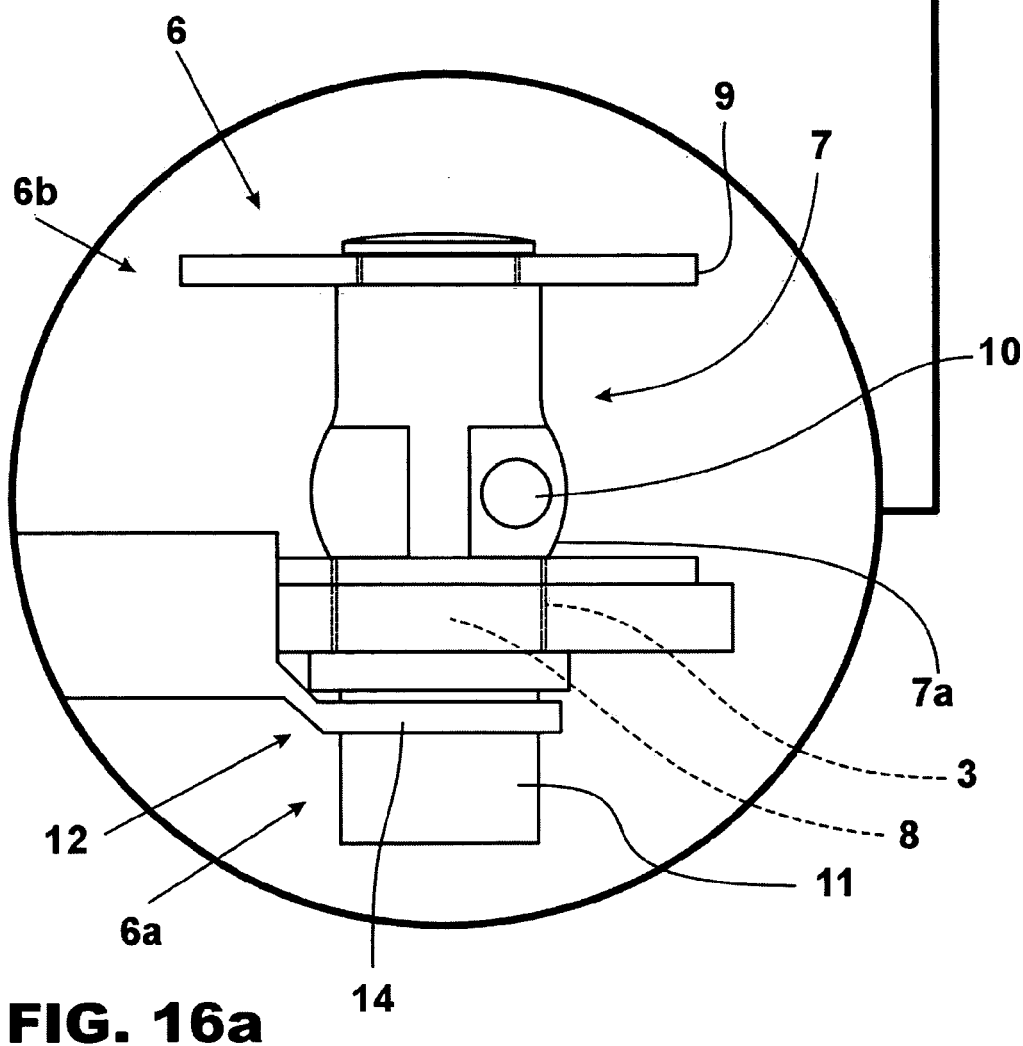
FIG. 16a

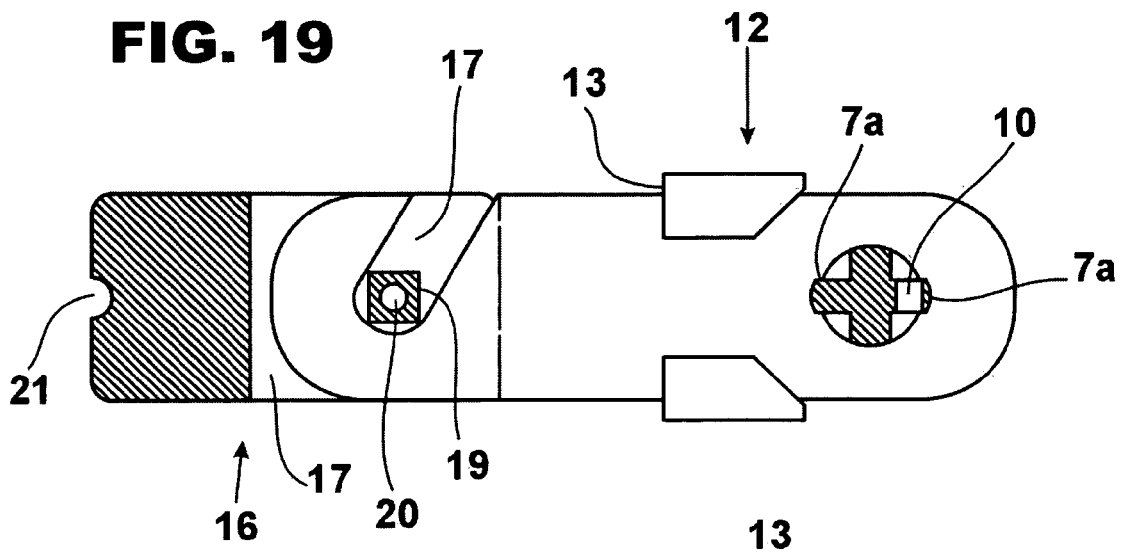
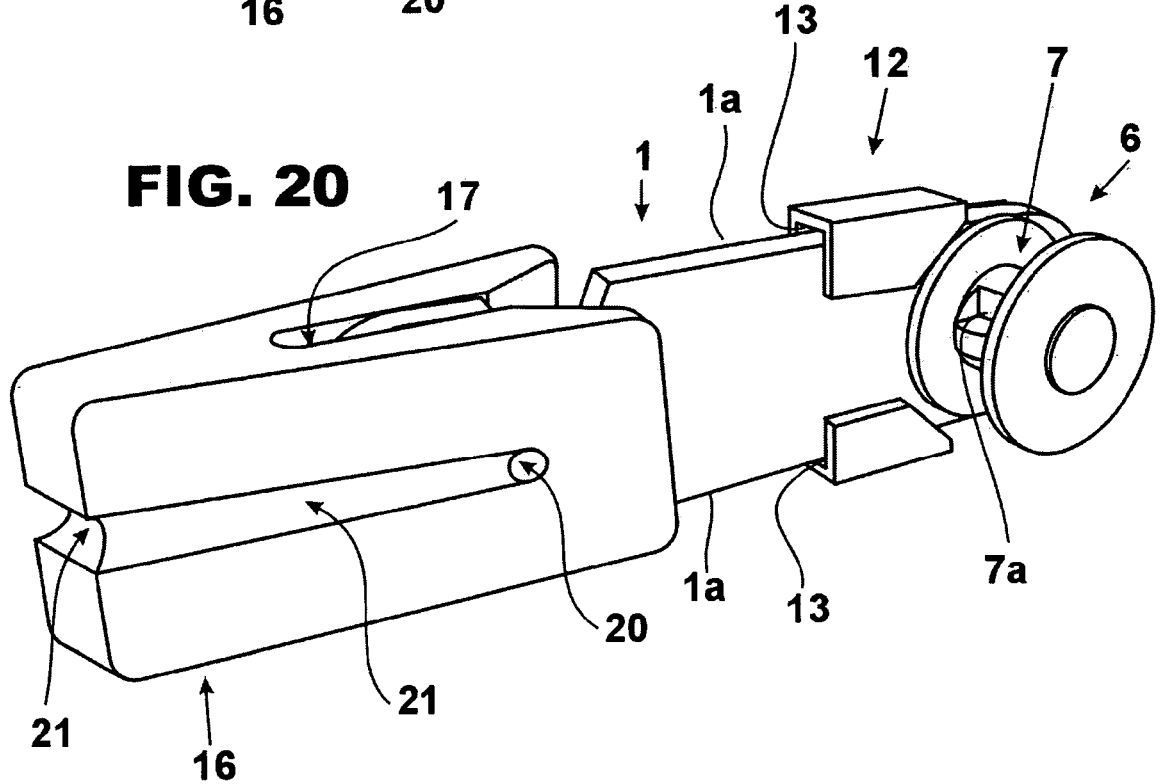
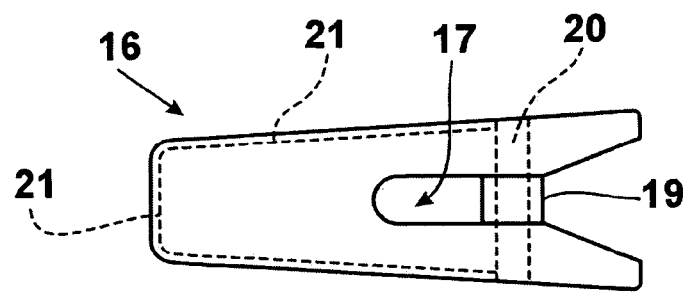

STRETCHING MEANS FOR FILIFORM ELEMENTS

RELATED APPLICATIONS

This application claims priority based on foreign applications P040101190 filed Apr. 7, 2004 in Argentina and P050100600 filed Feb. 18, 2005 in Argentina.

BACKGROUND OF THE INVENTION

1. Field of Invention

The present invention relates to the field of constructive structures such as fences, wire fences, wire layings in general, covers and any other arrangement formed by filiform elements capable of being stretched.

More particularly, it consists in a stretching means for filiform elements which is much simpler than conventional stretchers, much smaller, has fewer parts and a low manufacturing cost.

2. Description of Prior Art

Up to the present there have been stretchers such as the ones disclosed by Argentina patent document N° 476 (Bonifacio Medina Santurio, 17 Nov. 1885), N° 483 (Bonifacio Medina Santurio, 30 Nov. 1885), N° 885 (Francisco Solans, 19 May 1890) and N° 5373 (Pedro Zaffaroni, 2 Aug. 1907). There are also other known stretching means such as the ones disclosed by U.S. Pat. No. 2,451,389, U.S. Pat. No. 2,464,832, U.S. Pat. No. 2,519,921, U.S. Pat. No. 2,563,129 and U.S. Pat. No. 4,008,880.

Both these stretchers and most of the ones disclosed afterwards are based on a rotating reel mounted on two side walls. As a result, these stretching means are quite bulky since their main body is a sort of fork or support, on the side walls of which the ends of the reel axis are rotatively mounted, and the filiform element to be stretched is wound on said reel.

These conventional stretching means (also known as turnbuckles) are generally formed by several parts, which increases the possibilities of failures and production costs.

On the other hand, there are other known devices, such as the ones disclosed by Argentina patent N° 4142 (Diego Roy, 6 Apr. 1905) and N° 4652 (William Nepean Hutchinson, 18 May 1906). There are also other known devices, such as the ones disclosed by U.S. Pat. Nos. 3,213,899, 234,903 and U.S. Pat. No. 6,435,478. All these stretchers are less bulky than the ones based on the double rotating mounting on two side walls, but they lack a reel capable of revolving with respect to the main supporting part.

SUMMARY OF THE INVENTION

Objects and Advantages

One of the advantages of the present stretching means is that it is much simpler than other stretchers of similar capabilities (for example, the ones based on a mobile reel).

This constructive simplicity and the presence of fewer parts reduce the possibilities of operating failures, both before and after installation.

The fact that the mobile reel has only one rotating mounting on a main part which is substantially flat considerably reduces its bulk, which has a bearing both on the lighter weight to be supported by the application wire fence and on packaging and transportation.

Its simplicity greatly lowers manufacturing costs. Moreover, the the reduced amount of material used lowers costs even further.

Another advantage is that the simplicity of this stretching means matches with the easiness to install and operate it, which is highly appreciated in rural tasks.

A further advantage is that, by means of the addition of an insulating element, it is suitable for electrified wire layings.

Yet another advantage of the present stretching means is that it allows for a variation with two reels at the ends and an intermediate connection part, so that only one stretching means can be used to stretch two wires laid from the same pole, for example.

Finally, it should be highlighted that the present stretching means is suitable for various applications with filiform elements to be stretched. Such is the case of rural wire fences, all kinds of fences, wire layings to support covers, such as canvases or sunshade fabrics, etc.

DESCRIPTION OF DRAWINGS

For the sake of clarity and understanding of the object of the invention, the present device is illustrated in different figures in which it has been represented in one of the preferred embodiments, by way of example and not by limitation:

FIG. 1 is a perspective view of the stretching means in one of the possible embodiments.

FIG. 2 is an exploded perspective view showing the component parts of the stretching means of FIG. 1.

FIG. 6 is a perspective view of the stretching means including an insulating element for electrified wires.

FIG. 7 is an exploded perspective view which shows the component parts of the stretching means of FIG. 6.

FIG. 11 comprises drawings A, B and C, wherein:

Drawing A is a left lateral elevation view of the stretching means in an embodiment with two reels and an intermediate connection opening;

Drawing B is a left lateral elevation view of the same stretching means shown in drawing A; and Drawing C is a top elevation view of the same stretching means shown in drawing A.

Figure 12:
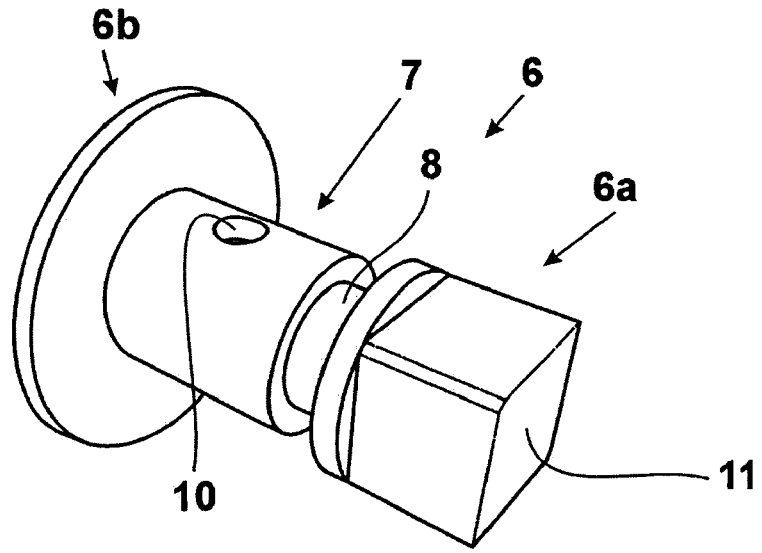

FIG. 12 is a perspective view of the mobile part in one of the possible embodiments.

Figure 13:
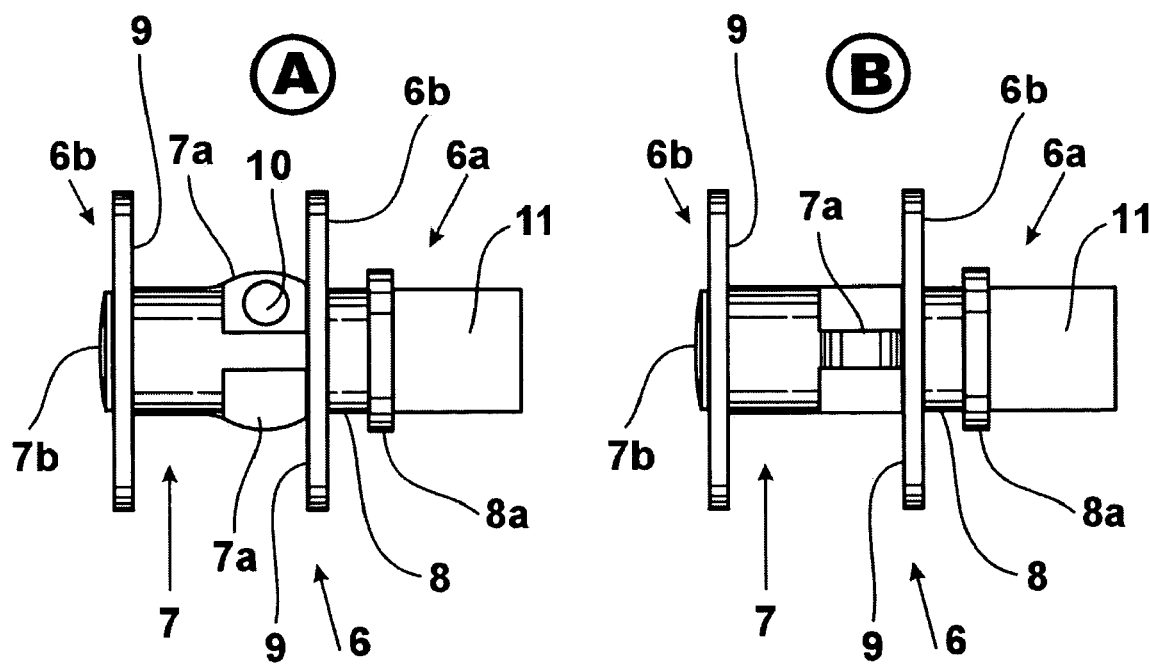

FIG. 13 is a perspective view showing the mobile part in another embodiment.

Figure 14:
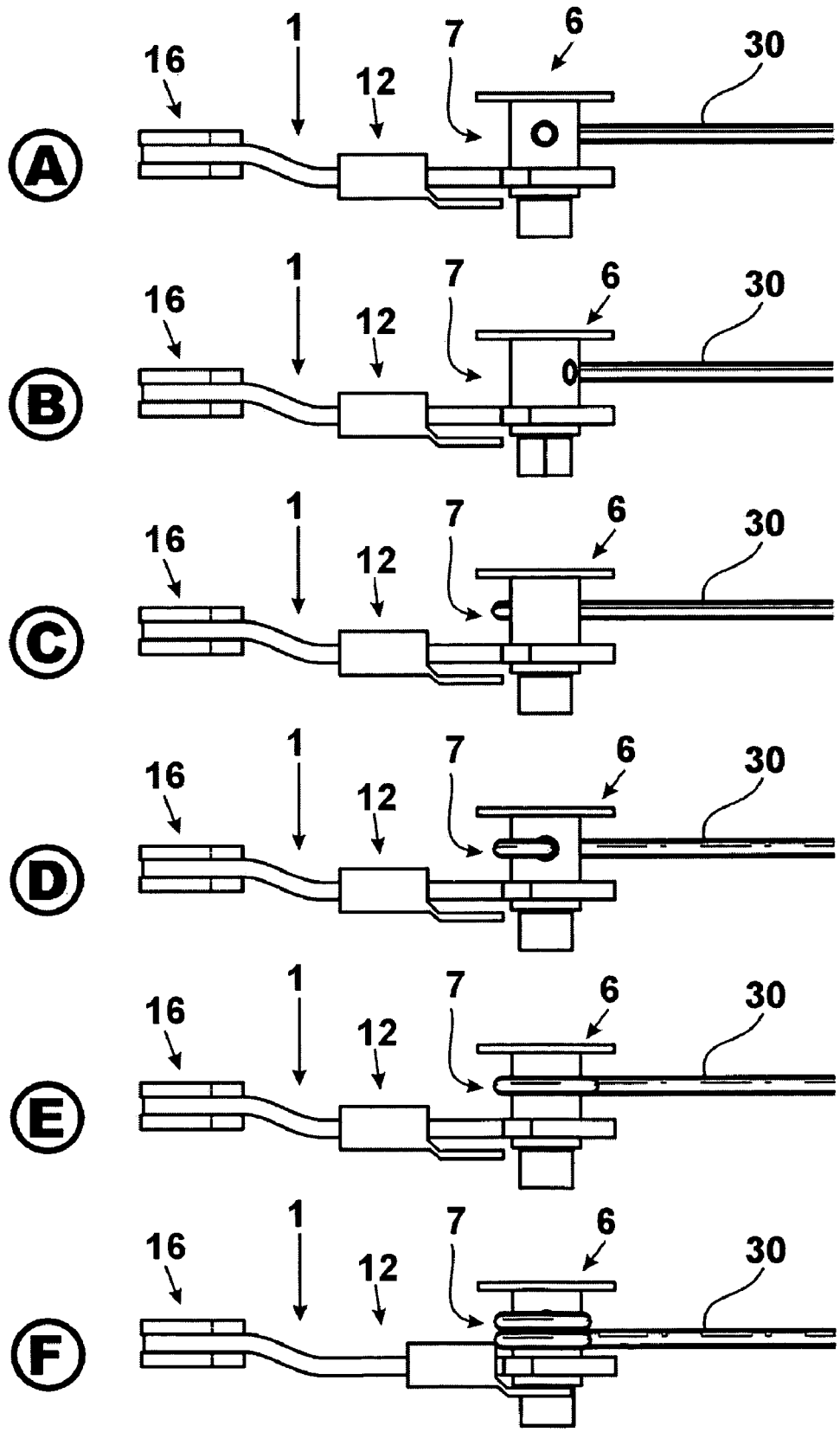
Figure 15A:
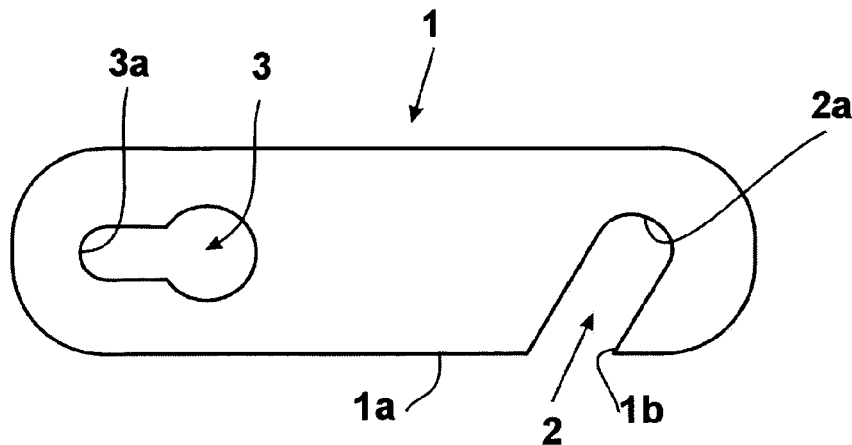
Figure 15B:
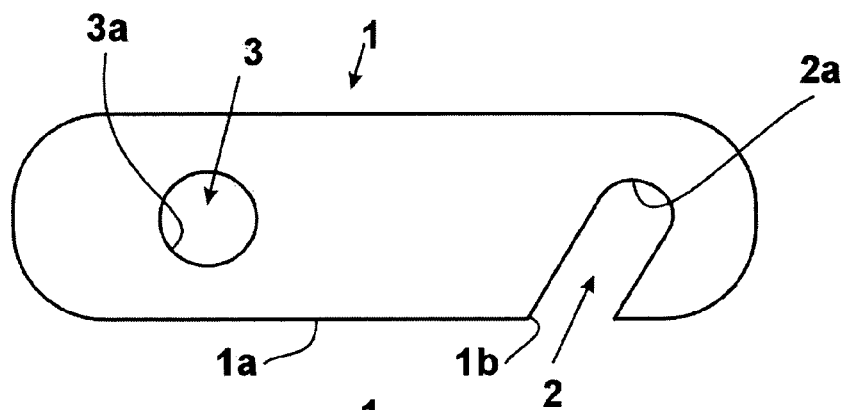
Figure 15C:
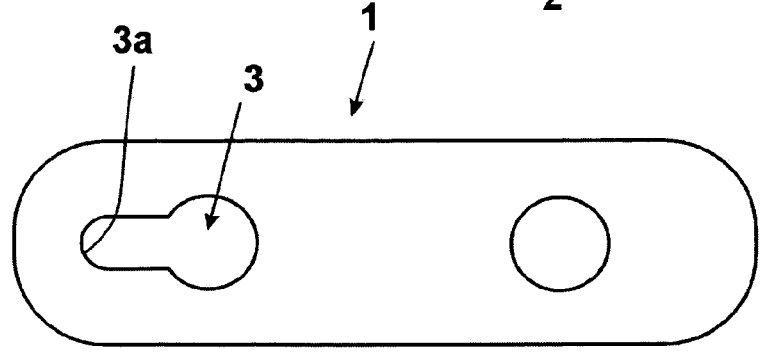
Figure 15D:
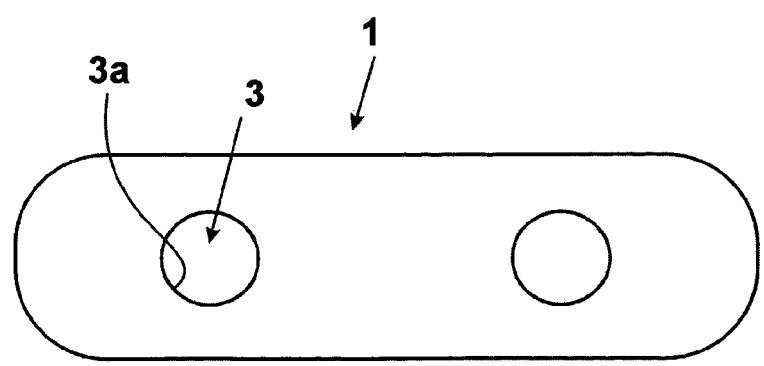

FIG. 14 comprises drawings A, B, C, D, E and F which, in respective top elevation views, show the sequence of engagement (drawing A), winding of the wire on the reel (drawings B, C, D and E) and finally engagement of the mobile cramp (drawing F).

FIGS. 15a, 15b, 15c and 15d show respective variations of the main body with different rotating mounting and connection openings.

Figure 3:
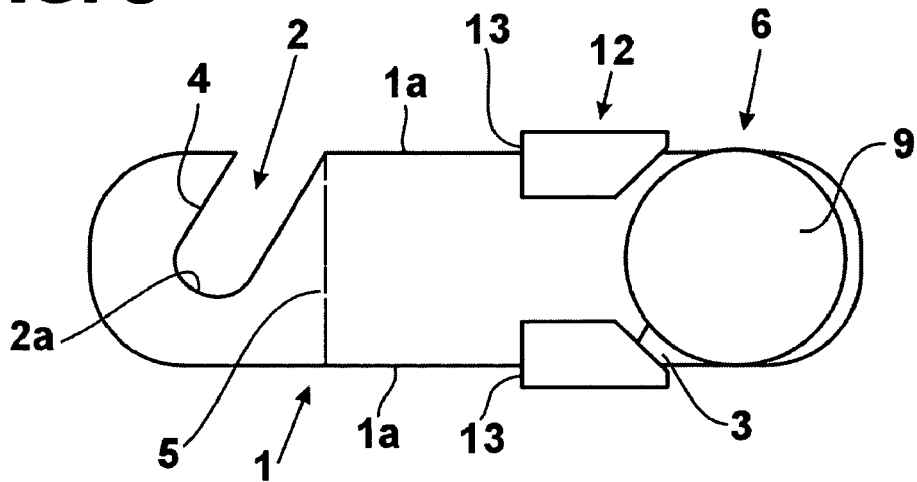
FIG. 3 is a right lateral elevation view of the stretching means of FIG. 1.
Figure 4:
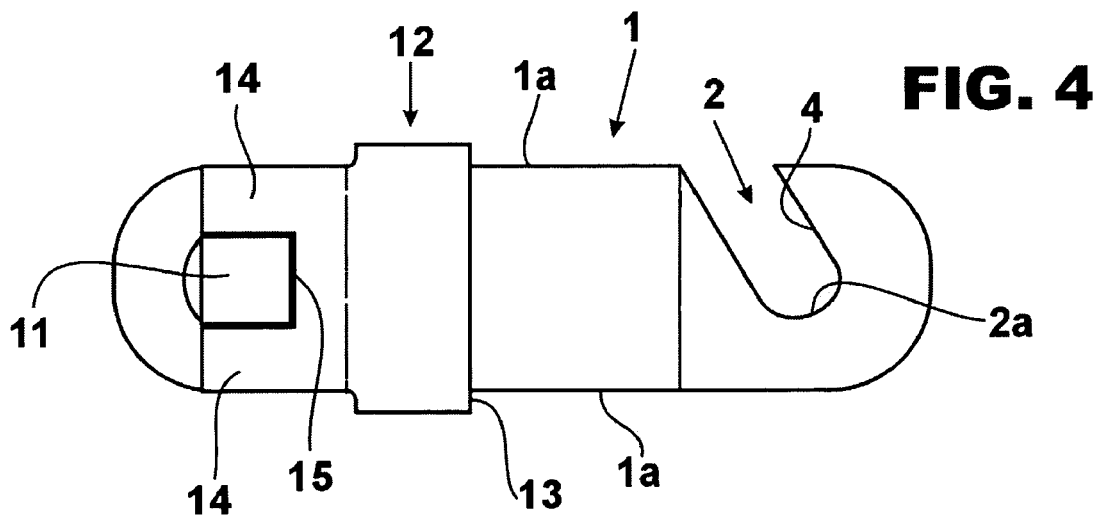
FIG. 4 is a left lateral elevation view of the stretching means of FIG. 1.
Figure 5:
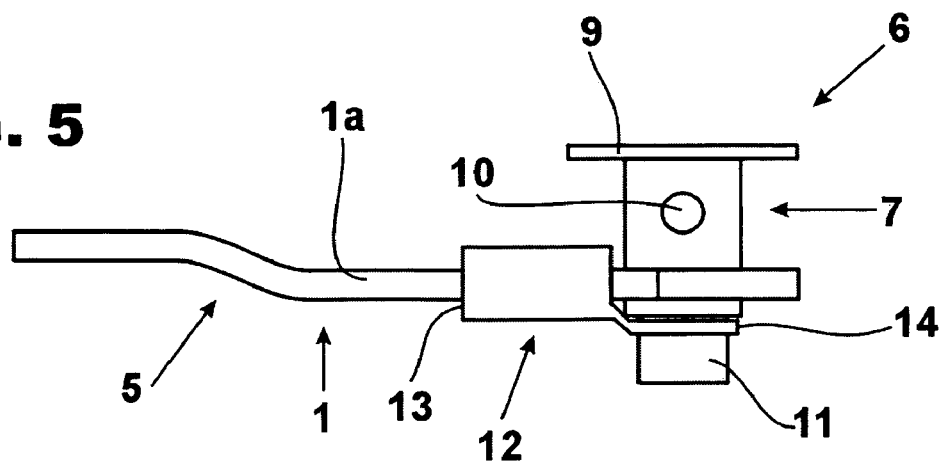
FIG. 5 is an elevation bottom view of the stretching means of FIG. 1.
Figure 8:
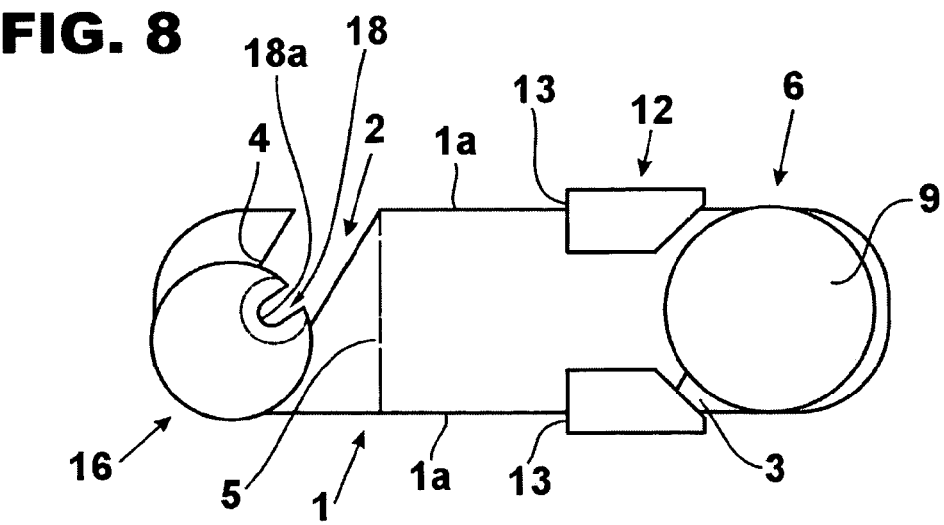
FIG. 8 is a right lateral elevation view of the stretching means of FIG. 6.
Figure 9:
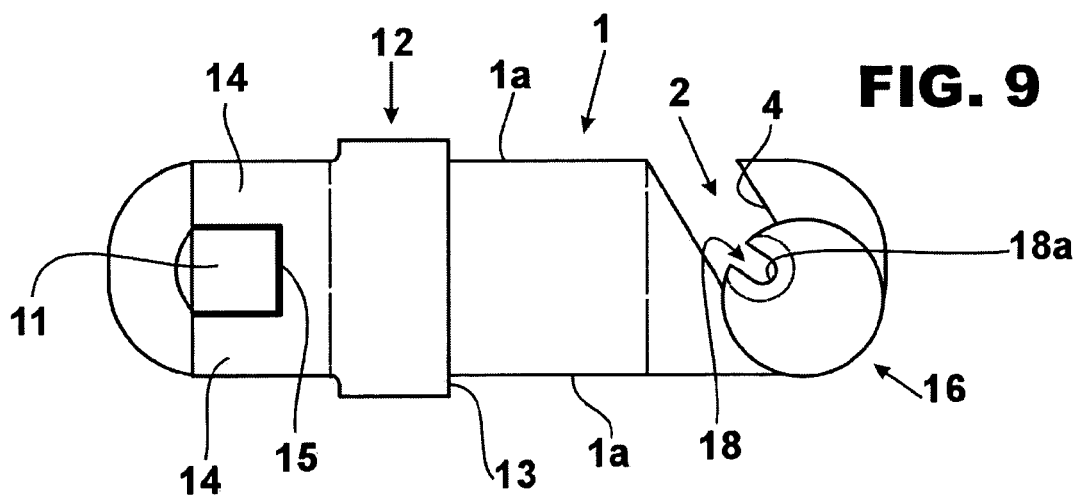
FIG. 9 is a left lateral elevation view of the stretching means of FIG. 6.
Figure 10:
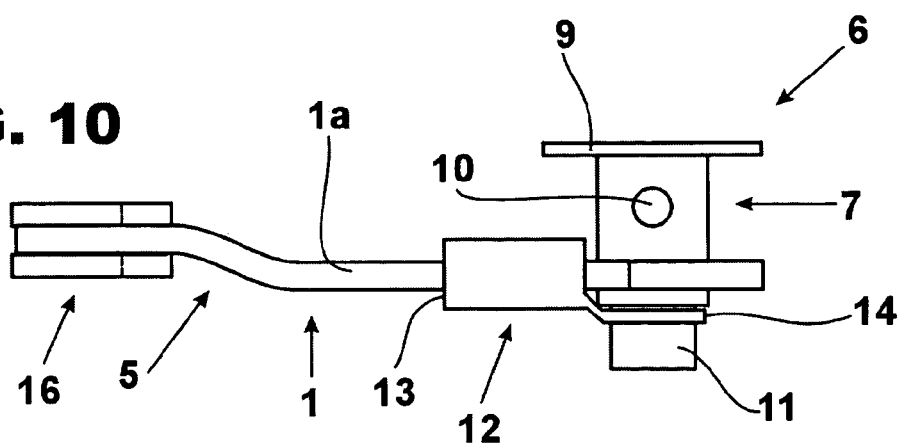
FIG. 10 is a top elevation view of the stretching means of FIG. 6.
Figure 11:
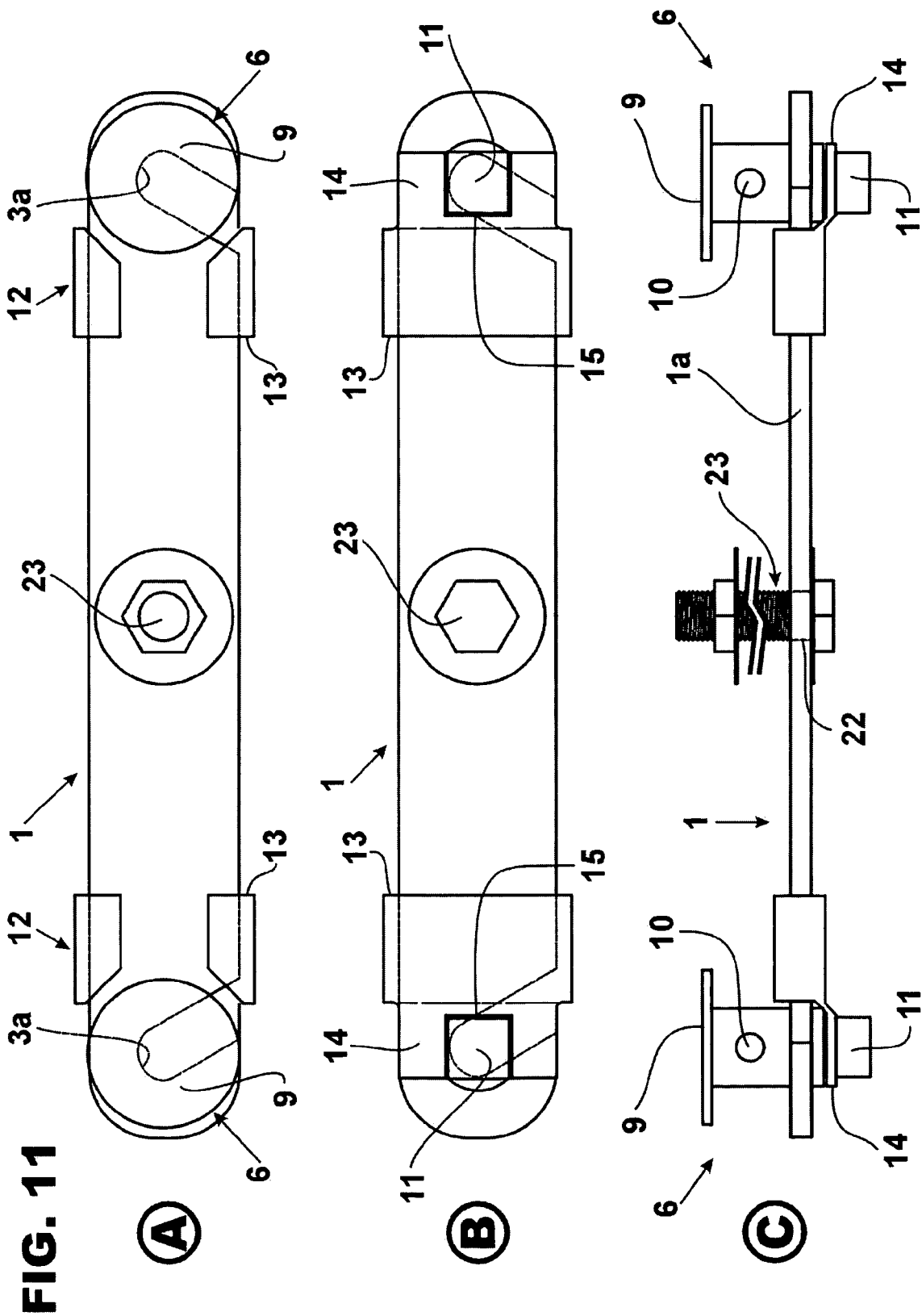

FIG. 16 is a bottom view, elevated, of the stretching means which mobile part is as illustrated in FIG. 3.

FIG. 16a is a bottom view, elevated, corresponding to a detail in FIG. 16.

Figure 17:
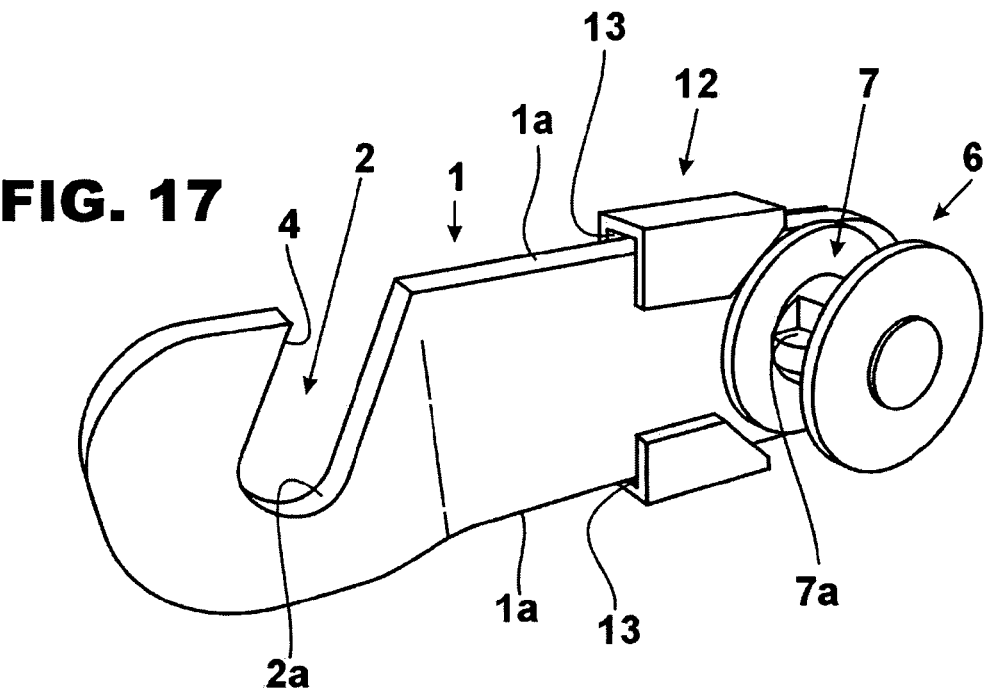

FIG. 17 is a perspective view of the stretching means according to FIG. 16.

Figure 18:
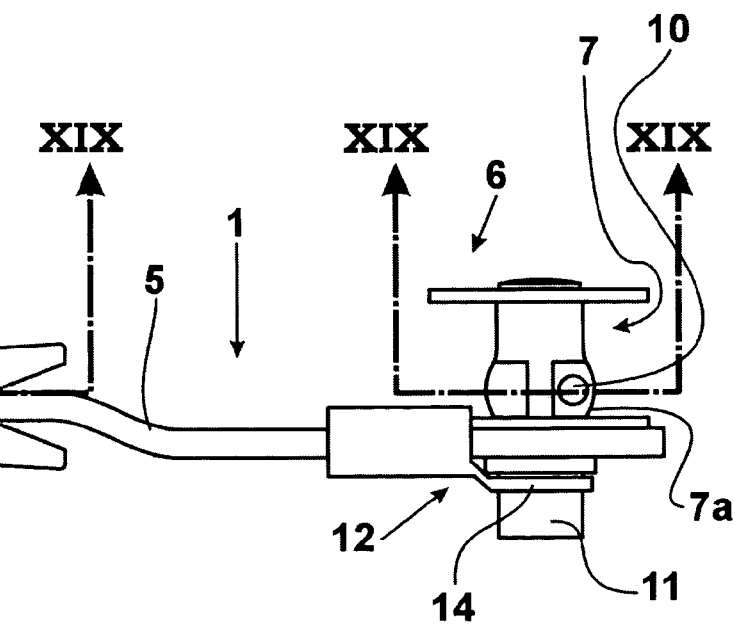

FIG. 18 is a bottom view, elevated, of the stretching means according to FIG. 16 with an insulating element.

FIG. 19 is a longitudinal section according to the section plane which appears indicated as XIX-XIX in FIG. 18.

FIG. 20 is a perspective view of the stretching means of FIG. 17 with the addition of an insulating element.

FIG. 21 is a bottom view, elevated, of the insulating element illustrated in FIGS. 18, 19 and 20.

In the different figures, like reference numerals and/or letters designate like or corresponding parts.

REFERENCE NUMERALS IN DRAWINGS (1) Main body.
(1a) Lateral edge of the main body (1).
(1b) Open lateral access.
(2) Connection opening.
(2a) Bottom of the connection opening (2).
(3) Rotating mounting opening.
(3a) Bearing formed by the bottom of the rotating mounting opening (3) [for the rotating part 6].
(4) Recessed inclination edges.
(5) Bending of the main body (1).
(6) Rotating part.
(6a) First component part of the rotating part (6).
(6b) Second components part of the rotating part (6).
(7) Winding reel.
(7a) Projections of the reel (7).
(8) Gudgeon or rotation axis of the rotating part (6).
(8a) Top wall of the gudgeon (8).
(9) Supporting walls of the reel (7).
(10) Engagement hole.
(11) Winding command head.
(12) Slide mobile cramp.
(13) Slides of the mobile cramp (12).
(14) Cramp fork.
(15) Cramp recess.
(16) Insulating element.
(17) Insertable throat [of the insulating element (16) into the bottom (2a)].
(18) Admission slot.
(18a) False insulating bottom.
(19) Anchor means [into the throat (17)].
(20) Admission slot [for electric conductors].
(21) Slided guides [for electric conductors].
(22) Fixing opening.
(23) Tie bolt.
(30) Filiform elements [wires].

DETAILED DESCRIPTION

In general terms, the present invention consists in a stretching means for filiform elements which comprises a main body (1) which comprises a connection opening (2) and a rotating mounting opening (3); on the latter there is a rotating part (6) endowed with a command head (11) which forms a winding reel (7) for the wire to be stretched; on the main body (11) there is a slide mobile cramp (12).

More particularly, the present stretching means can be applied to stretch any kind of filiform element (30) such as wires, ropes, strings, etc.

In the present embodiment, this stretching means comprises a main body (1) limited by lateral edges (1a) and by ends adjacent to which there is a rotating mounting opening (3) and a connection opening (5).

The bottom of the rotating mounting opening (3) forms a bearing (3a) on which a rotating part (6) is mounted.

This rotating part (6) forms a gudgeon or rotation axis (8) in its central part. To one side, a winding reel (7) is formed endowed with an engagement hole (10) and a supporting wall (9). To the opposite side of the rotation axis (8), there is a command head (11) which is used to wind the filiform element. This winding head (11) tightly fits into the cramp recess (15) formed by a fork (14) of the slide mobile cramp part (3).

The rotating part (6) may comprise a first component (6a) which conforms the command head (11) and the gudgeon (8) with a top wall (8a). On this first component (6a) there are two second components (6b) mounted which act as supporting walls (9) and form the winding reel (7). One of these second components (6b) is fixed to the outer part of the reel (7) whereas the other second component (6b) is arranged between the gudgeon and some projections (7a) that may be formed by impact; one of them, or both, having an engagement hole (10) for the filiform element (30) in one of its embodiments.

It has been considered that the rotating part (6) may be formed by two coupled parts (6a)(6b) which comprise a first part (6a) of the reel, in which mouth (7a) the end (8a) of a second part (6b) fits. The latter (6b) forms the command head (11) and is complemented with said first part (6a) to form the gudgeon (8).

For the rotating mounting, the rotating mounting opening (3) may be wider than the bottom (3a), in order to make the coupling operations of both parts (6a)(6b) easier.

The mobile cramp part (3) is slidingly guided on the lateral edges (1a) of the main body (1). For this purpose, it has slides (13) which, in the present embodiment, are formed by some folds.

On the other hand, the connection opening (2) may have different variations. In one embodiment, this connection opening (2) has a lateral access (1b) from which some inclination edges (4) extend which approximate to the end adjacent to the main body (1), as they approach the bottom (2a). In this way, said connection opening (2) adopts a form similar to that of a hook. In another embodiment, the connection opening (2) lacks the lateral access (1b).

Both openings (2)(3) may have a similar configuration, but with the rotating mounting opening (3) having a narrowed recess, as a retention means of the rotating part (6) in the bearing (3a).

Finally, the main body (1) has a transverse bending (5) which aligns the end of the connection opening (2) with the winding reel (7).

Said connection opening (2) may include an insulating means or an electrically insulating element (16) for electrified metal elements. In one of the embodiments, said electrically insulation element or means (16), on the one hand, forms a fitting throat (17) in the connection opening (2) while, on the other hand, it forms an admission slot (18) for an electric conductor filiform element. The admission slot (18) ends in an insulating false bottom (18a) which overlaps with the bottom (2) of said connection opening.

In a further embodiment, the insulating element (16) which is provided with at least an admission slot (20) for an electric conductor filiform element, forms a throat (17) insertable into the main body (1) at the height of the connection opening (2). This throat (17) is crossed by an anchor means (19) to engage into the connection opening (2).

In turn, the anchor means (19) is crossed by an admission slot (20) for the electric conductor (30). On the outer openings of this admission slot (20) originate some concurrent sliding guides (21) in which the electric conductor (30) is acommodated up to the tie or knotting point.

On the other hand, other embodiments have been considered, such as a variation which enables to stretch two or more wires from one structural element, such as a pole. In this case, the main body (1) may have two more rotating mounting openings (3) for respective rotating parts (6). Each one of these rotating parts (6) has a respective slide mobile cramp (12). In the intermediate part of the main body (1), there is one or more intermediate connection openings (19) suitable for tie bolts (20).

OPERATION

Once the stretching means has been connected and the end of the filiform element (30) to be stretched has been introduced into the engagement hole (10), it can be wound around the winding reel (7).

The winding to stretch the element is done by turning the command head (11). Once the suitable stretching has been achieved, the slide mobile cramp (12) is slided until said command head (11) is introduced into the cramp recess (15) formed by the cramp fork (14). Under these conditions, the rotating part (6) is fixed, keeping the tension.

What is claimed is:

1. A stretching device for filiform elements which is intended to stretch elements such as wires, ropes, strings and any other filiform element, which comprises:
    a main body member having ends thereon, with each of said ends having an opening located adjacent the end thereof;
    with one of said openings providing a connection opening and the other of said opening providing a rotating mounting opening;
    and wherein said main body member is a plate provided with said connection opening, therein having a recessed inclination in said plate relative to the opposite end of said plate to provide a hook-like structure therein;
    with said rotating mounting opening having an entrance area structurally arranged to receive a rotating part mounted therein, with said rotating part including a command head which forms a winding reel for the filiform element to be stretched; and
    a slide mobile cramp member slidably mounted on said main body member and which is structurally arranged to engage said rotating part to maintain said rotating part in a fixed condition.

2. The stretching device for filiform elements according to claim 1, wherein both of said openings adjacent the ends of said plate have an orientation relative to said adjacent ends.

3. The stretching device for filiform elements according to claim 1, wherein said rotating part includes a rotation axis which is rotatively mounted in said rotating mounting opening of said main body member; and wherein said rotation axis includes said winding reel and said command head.

4. The stretching device for filiform elements according to claim 1, wherein said main body member has a bending which aligns said connection opening end with said winding reel.

5. The stretching device for filiform elements according to claim 1, wherein said entrance area of said rotating mounting opening of the rotating part is narrowed to provide a retention means of said rotating part.

6. The stretching device for filiform elements according to claim 1, wherein said mounting opening of said rotating part opens until the lateral edge of the main body, where it forms a narrowing as a retention means of the rotating part.

7. The stretching device for filiform elements according to claim 1, wherein said rotating part consists of, at least, two parts joined to one another.

8. The stretching device for filiform elements according to claim 1, wherein said rotating axis includes said command head positioned on one side of said mounting opening and said winding real position of the other side of said mounting opening.

9. The stretching device for filiform elements according to claim 1, wherein said winding reel includes a projection thereon having an engagement hole therein to anchor the filiform element to said winding reel.

10. The stretching device for filiform elements according to claim 1, wherein said rotating mounting opening comprises an electrically insulating element which forms a throat insertable into the main body by the connection opening and forms an admission slot for an electric conductor filiform element therein.

11. The stretching means for filiform elements according to claim 1, characterized in that it comprises an electrically insulating element is provided with at least an admission slot for an electric conductor filiform element, forms a fitting throat insertable into the main body at the height of the connection opening; said throat being crossed by an anchor means of said electrically insulating means in the connection opening.

12. The stretching means for filiform elements according to claim 11, characterized in that the admission slot runs through the anchor means.

13. The stretching means for filiform elements according to claim 11, characterized in that from the openings of the admission slot in the electrically insulating means body originate some concurrent sliding guides for the arrangement of electric conductors.

14. The stretching means for filiform elements according to claims 11, characterized in that the insulating is of a detachable type.

15. The stretching means for filiform elements according to claim 1, wherein said insulating element is of a detachable type.

16. A stretching device for filiform elements which is intended to stretch elements such as wires, ropes, strings and any other filiform element, which comprises:
    a main body member having ends thereon, with each of said ends having an opening located adjacent the end thereof;
    with one of said openings providing a connection opening and the other of said opening providing a rotating mounting opening;
    and wherein said main body member is a plate provided with said connection opening, therein having a recessed inclination in said plate relative to the opposite end of said plate to provide a hook-like structure; a slide mobile cramp member slidably mounted on said main body member and which is structurally arranged to engage said rotating part to maintain said rotating part in a fixed condition; and
    wherein said main body member further includes lateral edges structurally arranged to receive said slide mobile cramp member to provide a runner for the sliding of said mobile cramp member thereon.

* * * * *